(12) United States Patent
Griffin et al.

(10) Patent No.: US 8,655,787 B1
(45) Date of Patent: Feb. 18, 2014

(54) AUTOMATED DETECTION OF DEFINED INPUT VALUES AND TRANSFORMATION TO TOKENS

(75) Inventors: Robert W. Griffin, Hollis, NH (US); Daniel V. Bailey, Pepperell, MA (US); Joshua A. Rosenthol, Centreville, VA (US)

(73) Assignee: EMC Corporation, Hopkinton, MA (US)

( * ) Notice: Subject to any disclaimer, the term of this patent is extended or adjusted under 35 U.S.C. 154(b) by 599 days.

(21) Appl. No.: 12/826,491

(22) Filed: Jun. 29, 2010

(51) Int. Cl.
*G06F 17/00* (2006.01)

(52) U.S. Cl.
USPC .............................................. 705/64; 705/50

(58) Field of Classification Search
USPC ........................................................ 705/65
See application file for complete search history.

(56) References Cited

U.S. PATENT DOCUMENTS

| | | | |
|---|---|---|---|
| 6,154,879 A | 11/2000 | Pare, Jr. et al. | |
| 7,069,439 B1 | 6/2006 | Chen et al. | |
| 8,069,053 B2 * | 11/2011 | Gervais et al. | 705/1.1 |
| 8,140,403 B2 | 3/2012 | Ramalingam et al. | |
| 8,225,089 B2 | 7/2012 | Wang et al. | |
| 8,244,643 B2 | 8/2012 | Coulter et al. | |
| 8,249,965 B2 | 8/2012 | Tumminaro | |
| 8,250,097 B2 | 8/2012 | Rhodes | |
| 2004/0255143 A1 | 12/2004 | Wemyss et al. | |
| 2006/0059548 A1 | 3/2006 | Hildre et al. | |
| 2006/0234678 A1 | 10/2006 | Juitt et al. | |
| 2006/0271730 A1 | 11/2006 | Ambilkar et al. | |
| 2008/0082837 A1 | 4/2008 | Mattsson | |
| 2008/0183488 A1 | 7/2008 | Vianello | |
| 2009/0022374 A1 | 1/2009 | Boult | |
| 2009/0199004 A1 | 8/2009 | Krawczewicz et al. | |
| 2009/0287837 A1 | 11/2009 | Felsher | |
| 2010/0257612 A1 | 10/2010 | McGuire et al. | |
| 2011/0307710 A1 * | 12/2011 | McGuire et al. | 713/183 |

FOREIGN PATENT DOCUMENTS

| EP | 1906336 A2 | 4/2008 |
|---|---|---|
| WO | 2010057546 A1 | 5/2010 |

* cited by examiner

*Primary Examiner* — Calvin L Hewitt, II
*Assistant Examiner* — John M Winter
(74) *Attorney, Agent, or Firm* — BainwoodHuang (57) ABSTRACT

A computer-implemented technique processes a potentially sensitive item of data (e.g., data which may be either a credit card number or a token having a similar format). The technique involves, after the potentially sensitive item of data is properly received within a physical memory location, generating a token result which indicates whether the potentially sensitive item of data satisfies a valid-token requirement. The technique further involves preserving the potentially sensitive item of data in an unaltered form within the physical memory location when the token result indicates that the potentially sensitive item of data satisfies the valid-token requirement. The technique further involves replacing the potentially sensitive item of data within the physical memory location with a token when the token result indicates that the potentially sensitive item of data does not satisfy the valid-token requirement.

23 Claims, 5 Drawing Sheets

AUTOMATED DETECTION OF DEFINED INPUT VALUES AND TRANSFORMATION TO TOKENS

BACKGROUND

Regulations and guidelines exist for the protection of non-public information (NPI), personally identifiable information (PII), and payment card industry (PCI) information. Such regulations and guidelines define, among other things, how and how long certain sensitive information such as Social Security numbers and credit card numbers can be stored by a third party.

Conventional tokenization equipment is available to assist third parties in maintaining compliance with sensitive information requirements. For example, suppose that a merchant wishes to collect customer purchase habit information in order to subsequently offer special discounts and promotions to specific customers. In such a situation, the merchant can employ a tokenization server which provides the merchant with tokens corresponding to its customers. The merchant is then able to accumulate customer data (e.g., frequencies of purchases, amounts of purchases, types of products or services purchased, etc.) and link that customer data to the tokens rather than to sensitive customer information such as customer credit card numbers.

Conventional data loss prevention (DLP) software is also available to assist third parties in maintaining compliance with sensitive information regulations and guidelines. For example, DLP software may run on a computer within a company to prevent unauthorized use and transmission of sensitive employee information such as employee Social Security numbers.

SUMMARY

With a large number of legacy applications in place which are configured to handle credit card numbers, it may be desirable to provision tokens so that the tokens satisfy standard credit card number criteria such as having a 16-digit format or possessing a proper check digit to pass certain consistency checks. For example, in the context of a customer transaction, conventional payment processing equipment may encounter a customer identifier which could be either a token or a credit card number. The conventional payment processing equipment then communicates with a tokenization server to determine whether the customer identifier is a token or a credit card number. If the customer identifier is a token, the conventional payment processing equipment completes the customer transaction in a first manner which processes the customer identifier as a token. On the other hand, if the customer identifier is a credit card number, the conventional payment processing equipment completes the customer transaction in a different manner which processes the customer identifier as a credit card number.

Unfortunately, such operation places a heavy burden on the tokenization server. In particular, the conventional payment processing equipment must communicate with the tokenization server for each customer identifier to determine whether that customer identifier is credit card number or a token.

It should be understood that the job of conventional DLP software is simply to intercept or uncover sensitive information residing on a computer before unauthorized use and/or transmission of that sensitive data. Unfortunately, conventional DLP software may not be able to distinguish tokens from credit card numbers since the tokens are purposefully provisioned to satisfy standard credit card number criteria.

In contrast to the above-described conventional mechanisms, improved techniques involve automatic detection of a defined input value and transformation of that defined input value into a token. For example, upon receipt of potentially sensitive information, an electronic device can determine whether that potentially sensitive information is a credit card number (i.e., a defined input value) or perhaps a token. Such a determination is possible even if the token satisfies certain credit card number criteria. If the electronic device determines that the potentially sensitive information is a credit card number, the electronic device can automatically communicate with a tokenization server in order to replace the credit card number with a token. However, if the electronic device determines that the potentially sensitive information is a token, the electronic device does not need to communicate with the tokenization server thus reducing the workload on the tokenization server. That is, some of the work in resolving whether the potentially sensitive information is a credit card number or a token is shifted from the tokenization server to the electronic device. Such operation alleviates the need for the electronic device (e.g., payment processing equipment) to communicate with the tokenization server for each item of potentially sensitive information which could be either a token or a credit card number.

It should be understood that there may be value in forming tokens which fit certain standard credit card number criteria since such tokens may then be more compliant with legacy software and equipment which are constructed and arranged to process numbers fulfilling this criteria. In situations which utilize tokens that comply with the standard credit card number criteria, it is nevertheless possible to impose additional constraints (e.g., set certain bits, instill a watermark, verify a check code, etc.) for a token. As a result, any item of potentially sensitive information which does not pass the requirements for a token can be deemed to not be a token and thus treated as a defined input value which is automatically transformed into a token.

In some arrangements, existing DLP software is augmented to distinguish between credit card numbers and tokens. The augmented DLP software is then installed on systems that would normally query a tokenization server for resolution. Accordingly, the burden of distinguishing an item of information into a credit card number or token is moved from the tokenization server to other systems.

In other arrangements, an item of information is processed by a DLP module in combination with an additional token detector module. In particular, the DLP module initially evaluates the information and identifies whether that information is potentially sensitive, i.e., whether the information satisfies standard credit card number criteria. If the DLP module determines that the information does not satisfy the standard credit card number criteria, the information is deemed to be non-sensitive and its further use and transmission are permitted. However, if the DLP module determines that the information satisfies the standard credit card number criteria, the DLP module (i) deems the information to be potentially sensitive (i.e., the information could include a credit card number) and (ii) signals the additional token detector module to further process the information.

During this further processing, the additional token detector module evaluates the potentially sensitive information to determine whether the potentially sensitive information is actually a credit card number or a token. If the additional token detector module determines that the potentially sensitive information is not a token, the additional token detector module can contact a tokenization server to automatically replace the potentially sensitive information with a token.

However, if the additional token detector module determines that the potentially sensitive information satisfies a set of token criteria, the additional token analyzing module deems the information to be non-sensitive (without the need for communicating with the tokenization server) and further use and transmission of the information are permitted.

One embodiment of the improved techniques is directed to a computer-implemented method of processing a potentially sensitive item of data (e.g., data which may be either a credit card number or a token having a similar format). The method includes, after the potentially sensitive item of data is properly received within a physical memory location, generating a token result which indicates whether the potentially sensitive item of data satisfies a valid-token requirement. The method further includes preserving the potentially sensitive item of data in an unaltered form within the physical memory location when the token result indicates that the potentially sensitive item of data satisfies the valid-token requirement. The method further includes replacing the potentially sensitive item of data within the physical memory location with a token when the token result indicates that the potentially sensitive item of data does not satisfy the valid-token requirement.

Additionally, some embodiments of the improved techniques are directed to a computer program product including a non-transitory computer readable storage medium which stores instructions that cause a computer to perform the method of processing the potentially sensitive item of data. In some arrangements, the instructions are compiled and linked executable code. In other arrangements, the instructions are scripts or rules which are dynamically translated and then performed by the computer.

Furthermore, some embodiments of the improved techniques are directed to an electronic device (or electronic system) which performs the method of processing the potentially sensitive item of data. Here, various components of the electronic device and/or system communicate and exchange electronic signals to carry out the method of processing the potentially sensitive item of data.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of processing potentially sensitive information involves automatic detection of a defined input value and transformation of the defined input value into a token. In particular, upon review of potentially sensitive information, an electronic device evaluates whether that potentially sensitive information is actual sensitive information (e.g., a credit card number) or non-sensitive information (e.g., a token). If the electronic device determines that the potentially sensitive information is actual sensitive information (i.e., the defined input value), the electronic device automatically communicates with a tokenization server in order to replace the actual sensitive information with a token. On the other hand, if the electronic device determines that the potentially sensitive information is non-sensitive information (e.g., the potentially sensitive information is actually a token), the electronic device does not communicate with the tokenization server thus reducing the demand on the tokenization server. Such an evaluation is possible even if the non-sensitive information satisfies certain sensitive information criteria, e.g., tokens may satisfy certain sensitive information criteria but do not include actual sensitive information.

Figure 1:
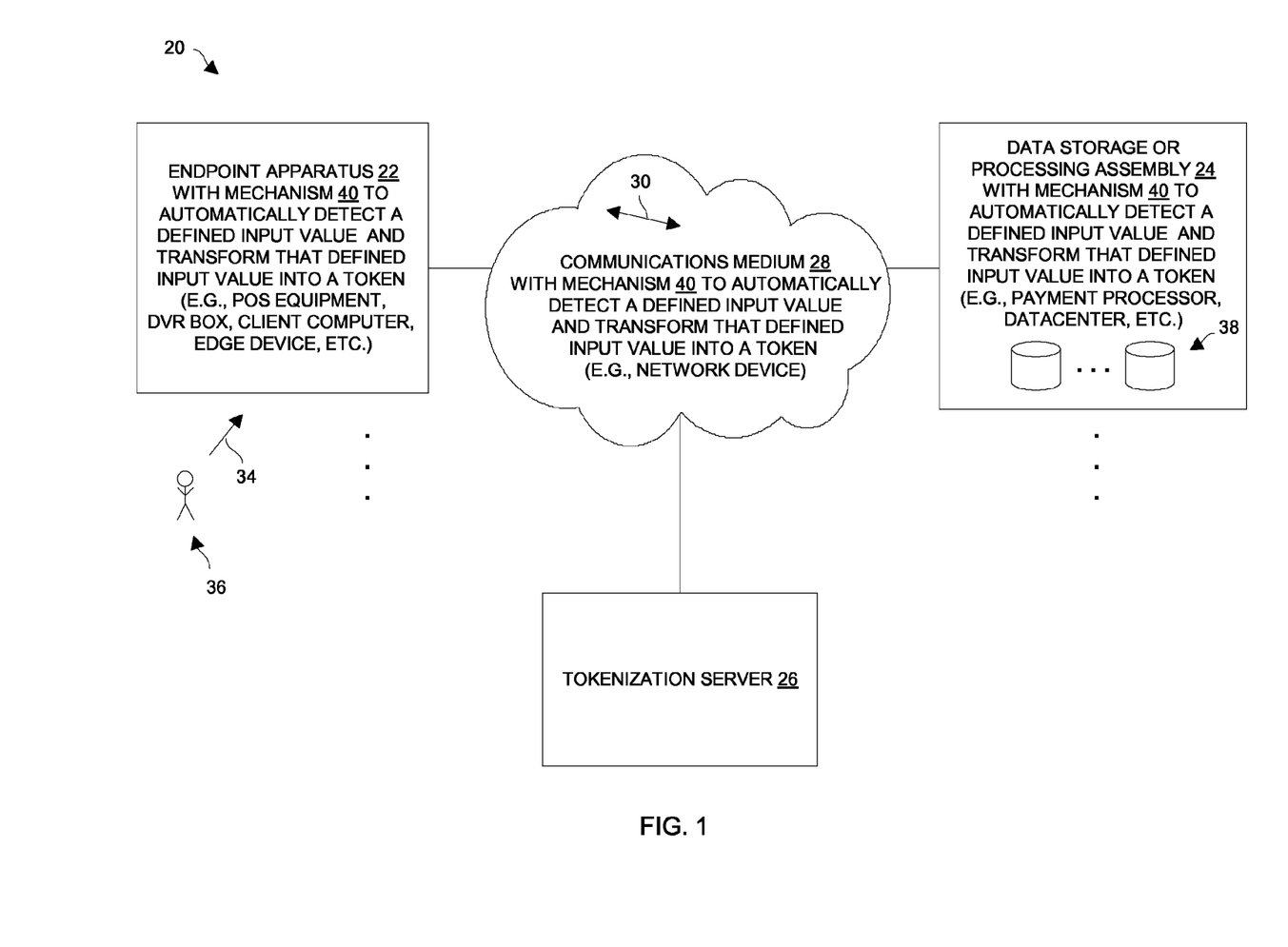
FIG. 1 is a block diagram of an electronic environment which is constructed and arranged to automatically detect a defined input value and transform the input value into a token.

FIG. 1 shows an electronic environment 20 which is constructed and arranged to automatically detect a defined input value (e.g., actual sensitive information) and transform the defined input value into a token. The electronic environment 20 includes an endpoint apparatus 22, a data storage or processing assembly 24, a tokenization server 26, and a communications medium 28.

The communications medium 28 is constructed and arranged to convey electronic signals 30 between the various components of the electronic environment 20 to enable the components to communicate effectively and efficiently. Along these lines, the electronic signals 30 may take a variety of forms including electrical signals, optical signals, wireless signals, combinations thereof, and so on. Additionally, the communications medium 28 may implement a variety of protocols such as TCP/IP, UDP, ATM, Ethernet, Fibre Channel, combinations thereof, and the like. Furthermore, the communications medium 28 may include various components (e.g., cables, switches, gateways/bridges, NAS/SAN appliances/nodes, interfaces, etc.). Moreover, the communications medium 28 is capable of having a variety of topologies (e.g., hub-and-spoke, ring, backbone, multi-drop, point-to-point, irregular, combinations thereof, and so on).

The endpoint apparatus 22 takes the form of an electronic device such as point-of-sale (POS) equipment, a digital video recorder box, a client computer, a general user device, a laptop or handheld device, or another type of edge or endpoint circuit which handles items of information 34 and determines whether the items of information 34 are defined input values. The items of information 34 may be provided manually by a user 36 or electronically from another device (e.g., a credit card, a shopping card, a computer, etc.).

Similarly, the data storage or processing assembly 24 takes the form of another electronic device such as payment processor equipment, a datacenter, a processing or database engine, etc. having a set of storage devices 38. Again, the items of information 34 may be provided manually by a user 36 or electronically from another device (e.g., a credit card, a shopping card, a computer, etc.).

Likewise, the communications medium 28 may be implemented as one or more electronic devices which are distributed over a particular area (e.g., a local computer network, a campus, a wide area, a company network, a network of stores, an online sales facility, etc.). At least a portion of the communications medium 28 may include the Internet.

In the electronic environment 20, at least one of the endpoint apparatus 22, the data storage or processing assembly 24, and the communications medium 28 is provisioned with a mechanism 40 for automatically detecting a defined input value and transforming that input value into a token. Once provisioned with this mechanism 40, the particular component 22, 24, 28 is able to detect potentially sensitive information from general items of information, and then determine whether the potentially sensitive information fulfills the requirements of the defined input value (i.e., whether an item of information is actual sensitive information) or non-sensitive information. If the information is non-sensitive, the component 22, 24, 28 is able to use and/or transmit the information without communicating with the tokenization server 26.

It should be understood that, in some arrangements, the electronic environment includes multiple endpoint apparatus 22 and/or multiple data storage or processing assemblies 24 which are equipped with the mechanism 40 for automatically detecting the defined input value and transform that defined input value into a token (illustrated by the ellipses). The resulting gains due to distributing work that would otherwise be performed by the tokenization server 26 to other devices includes a significant reduction in the overall burden on the tokenization server 26, as well as an improvement in bandwidth to and from the tokenization server 26. Further details of the operation of an electronic device which is equipped with the mechanism 40 will now be provided with reference to FIG. 2.

Figure 2:
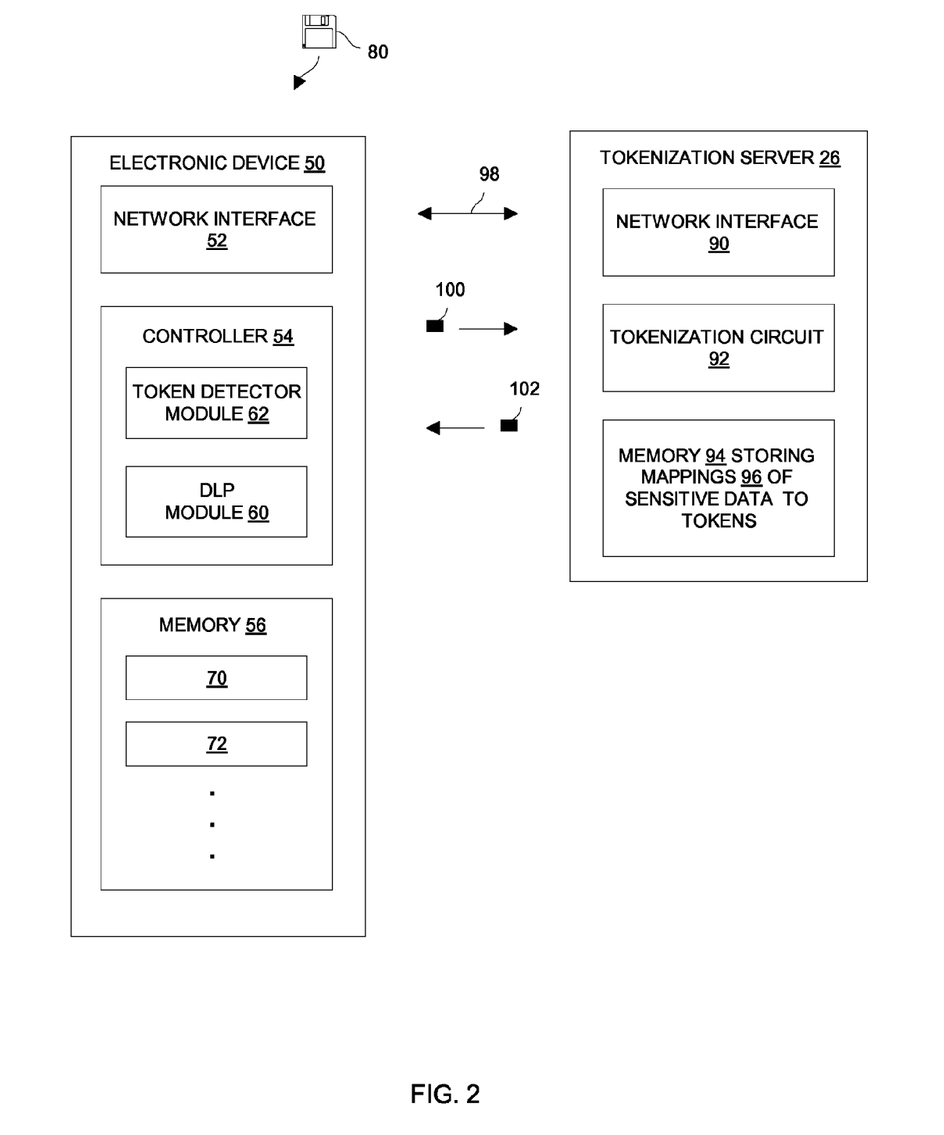
FIG. 2 is a block diagram showing particular details of the automatic detection and transformation process utilized by the electronic environment of FIG. 1.

FIG. 2 shows particular details of an electronic device 50 having the mechanism 40, and how the electronic device 50 coordinates operation with the tokenization server 26. The configuration of the electronic device 50 is suitable for any of the components 22, 24, 28 of the electronic environment 20 (FIG. 1).

As shown in FIG. 2, the electronic device 50 includes a network interface 52, a controller 54 and memory 56. The controller 54 couples to the network interface 52 for external access, and to the memory 56 for access to information which may be sensitive.

The controller 54 includes a DLP module 60 and a token detector module 62. As will be described in further detail shortly, the DLP module 60 and the token detector module 62 operate in a pipelined manner to analyze the information stored in the memory 56 and replace the information if the information is the defined input value.

The memory 56 includes memory locations 70 for storing information for evaluation, as well as other memory locations 72 for storing memory constructs which enable operation of the electronic device 50. The memory locations 72 may store, among other things, an operating system, applications (e.g., POS code, user-level applications, etc.), and specialized software for implementing the mechanism 40.

That is, in some arrangements, the controller 54 is implemented using a microprocessor and memory which stores instructions that enable the microprocessor to automatically detect the defined input value and transform the defined input value 34 into a token (also see the capabilities 32 in FIG. 1). In these arrangements, the instructions are capable of being delivered via a computer program product 80 which includes a non-transitory computer readable storage medium storing the instructions (e.g., executable code) which control the operation of the microprocessor. Examples of suitable computer readable storage media for the computer program product 80 include CD-ROM, flash memory, magnetic diskettes, magnetic tape, and the like.

In other arrangements, the controller 54 is implemented in specialized hardware. Such hardware may include application specific integrated circuits, field programmable gate arrays, and so on.

As further shown in FIG. 2, the tokenization server 26 includes a network interface 90, a tokenization circuit 92 and memory 94 which stores mappings 96 of sensitive information (e.g., credit card numbers) to tokens. The tokenization server 26 is constructed and arranged to communicate with the electronic device 50 (arrow 98), as well as other electronic devices 50 of the electronic environment 20 (FIG. 1). For example, the tokenization server 26 receives token requests 100 from the electronic device 50 and provides tokens 102 in response to the token requests 100.

During operation, the controller 54 examines information from the memory locations 70 of the memory 56. In the context of the endpoint apparatus 22, the controller 54 may examine manually entered user information (input from a keyboard and/or mouse), information received electronically (e.g., email, a downloaded file, etc.). Additionally, in the context of the communications medium 28, the controller 54 may examine network traffic through one or more nodes of communications medium 28. In the context of the data storage or processing assembly 24, the controller 54 may examine databases, large data files or logs, transaction lists, and so on.

At some point (e.g., upon receipt of the potentially sensitive item of data, upon attempted use or transmission of the potentially sensitive item of data, during a periodic scan, etc.), the DLP module 60 of the controller 54 determines whether the potentially sensitive item of data satisfies a first set of criteria. For example, in the context of a possible credit card number, the DLP module 60 can evaluate whether the potentially sensitive item of data satisfies standard credit card number criteria such as having a 16-digit format or possessing a proper check digit in order to pass a standard credit card consistency check, and so on. Examples of products which are suitable for use as at least a portion of the DLP module 60 are available in DLP products such as the RSA DLP Suite offered by RSA, The Security Division of EMC Corporation of Hopkinton, Mass.

If the DLP module 60 determines that the potentially sensitive item of data satisfies the first set of criteria (e.g., standard credit card number requirements), the DLP module 60 outputs an appropriate DLP result to the token detector module 62. In response to the DLP result, the token detector module 62 further analyzes the potentially sensitive item of data to determine whether the potentially sensitive item of data is clearly not a token. To this end, the token detector module 62 inspects the potentially sensitive item of data for certain additional requirements for a valid token (e.g., the setting of certain bits, the presence of a watermark, the passing of check code evaluation, etc.). As a result, any potentially sensitive item of information which passes the standard credit card requirements but which does not pass the requirements for a token can be deemed not a valid token and thus should be treated as the defined input value which is automatically transformed into a token. Some token self-identification techniques which are suitable for use in the electronic environment 20 are described in U.S. application Ser. No. 12/826,481, filed on even date herewith, entitled "SELF-IDENTIFICATION OF TOKENS", the teachings of which are hereby incorporated in their entirety.

If the controller 54 cannot conclude that the potentially sensitive item of data is a valid token, the controller 54 communicates with the tokenization server 26 and automatically replaces the item of data (which has now been deemed to be sensitive since the controller concludes that the item of data is the defined input value 34) with a token. In particular, the controller 54 sends token request 100 and the item of data to the tokenization server 26. The tokenization circuit 92 of the tokenization server 26 receives the token request 100 through the network interface 90 and performs a transformation operation to generate a token 102 based on the item of data. Next, the tokenization server 26 sends the token 102 to the electronic device 50 through the network interface 90. Additionally, the tokenization circuit 92 creates a mapping 96 of the item of data to the generated token 102 to enable subsequent lookup by trusted electronic devices.

When the controller 54 of the electronic device 50 receives the token 102 from the tokenization server 26, the controller 54 replaces the item of data with the token 102. Preferably, the controller 54 overwrites the memory location 70 in the memory 56 which originally stored the item of data with the token 102.

However, if the controller 54 concludes that the potentially sensitive item of data is already a token, the controller 54 does not need to communicate with the tokenization server 26. Rather, the controller 54 can eliminate or at least defer such communication and treat the item of data as non-sensitive until further notice. Such operation lessens the demands placed on the tokenization server 26 by distributing the work of token detection to other equipment. Further details will now be provided with reference to FIG. 3.

Figure 3:
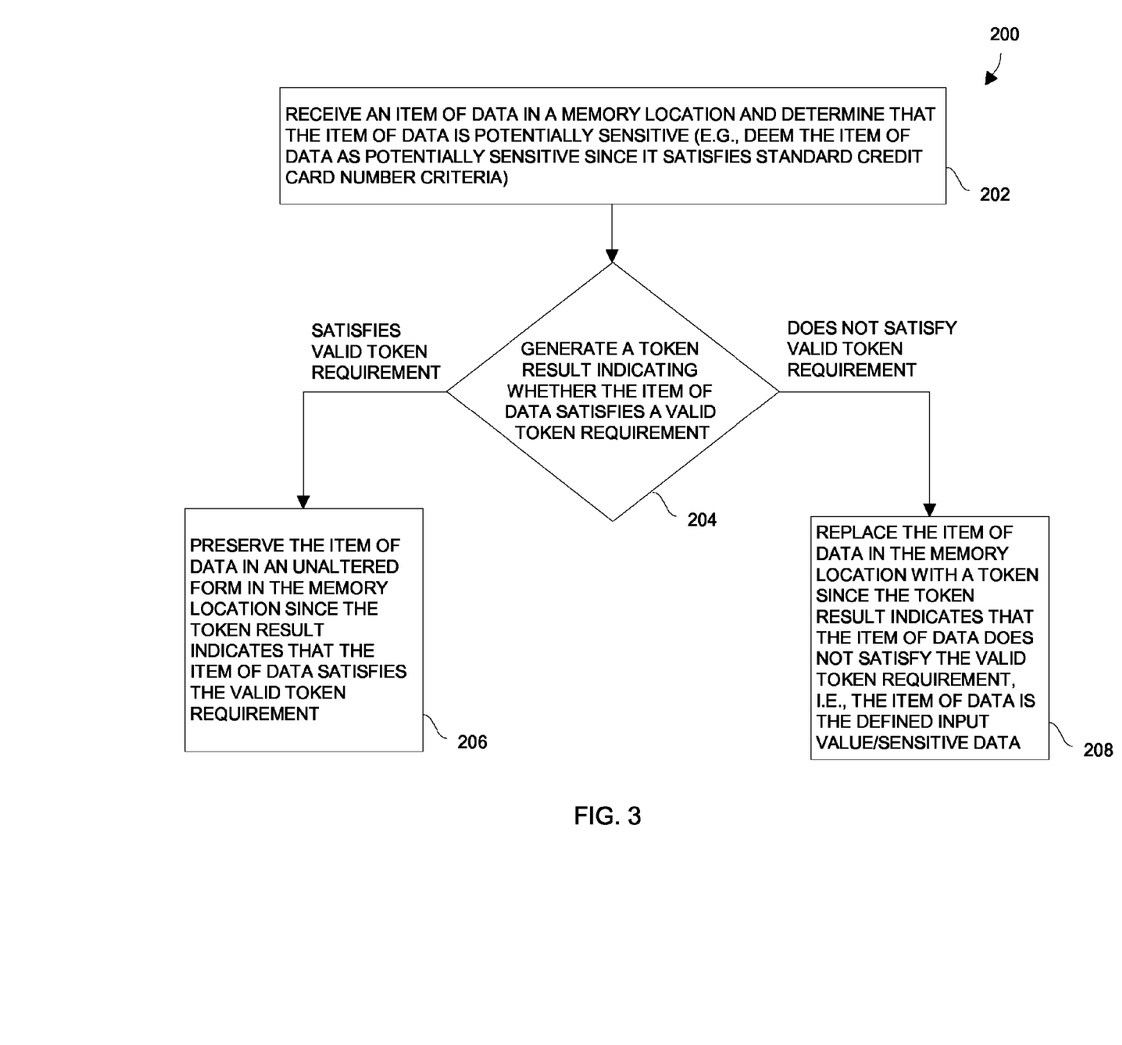
FIG. 3 is a block diagram showing the relationship between various types of information handled by the electronic environment of FIG. 1.

FIG. 3 is a flowchart of a procedure 200 which is performed by the controller 54 of the electronic device 50 (FIG. 2) when processing a potentially sensitive item of data. In step 202, the controller 54 receives an item of data within a physical memory location 70 and determines that the item of data is potentially sensitive since it satisfies certain criteria. In the context of the earlier-provided credit card number example, the DLP module 60 of the controller 54 determines that the item of data satisfies the standard credit card number criteria.

In step 204, the controller 54 generates a token result which indicates whether the potentially sensitive item of data satisfies a valid-token requirement. In the context of the earlier-provided credit card number example, the token detector module 62 of the controller 54 determines that the potentially sensitive item of data satisfies a set of criteria for a token, i.e., the item of data meets the requirements for the defined input value. Step 204 proceeds to step 206 when the token result indicates that the potentially sensitive item of data satisfies the valid-token requirement. Step 204 proceeds to step 208 when the token result indicates that the potentially sensitive item of data does not satisfy the valid-token requirement.

In step 206, the controller 54 preserves the item of data in an unaltered form within the physical memory location since the token result indicates that the item of data satisfies the valid-token requirement. That is, the item of data is safely deemed to be a valid token, and the controller 54 is able to use and/or transmit the item of data.

In contrast, in step 208, the controller 54 replaces the potentially sensitive item of data within the physical memory location 70 with a token 102 since the token result indicates that the potentially sensitive item of data does not satisfy the valid-token requirement. That is, the potentially sensitive item of data is now deemed to be sensitive data, i.e., the defined input value, and the controller 54 communicates with the tokenization server 26 to replace the defined input value with a token 102. Further details will now be provided with reference to FIGS. 4 through 5.

Figure 4:
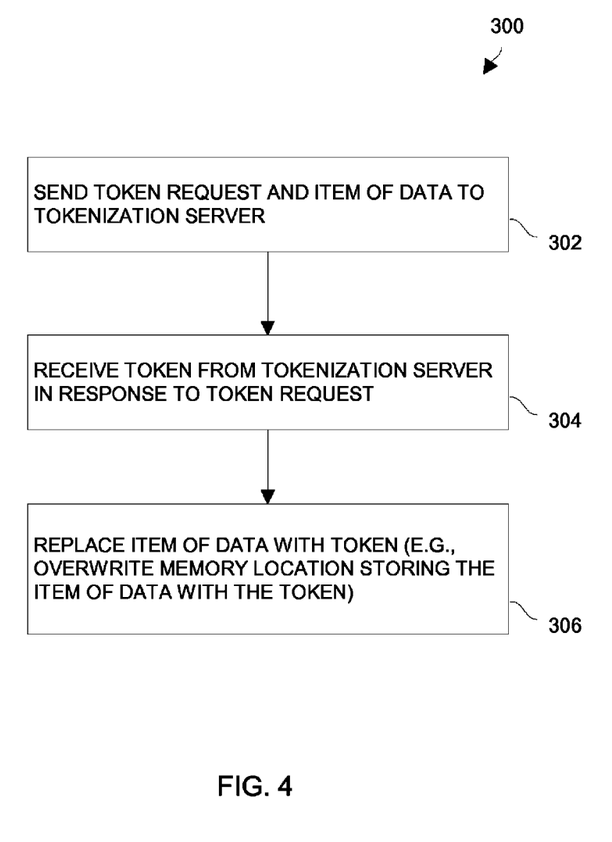
FIG. 4 is a flowchart of a procedure performed by an electronic device of the electronic environment of FIG. 1.

FIG. 4 shows a procedure 300 which is performed by an electronic device 50 when the controller 54 of the electronic device 50 determines that an evaluated item of data is the defined input value. For example, the item of data may satisfy standard credit card criteria but is clearly not a token.

In step 302, the controller 54 sends a token request 100 and the item of data to the tokenization server 26 (also see FIG. 2).

In step 304, the controller 54 then receives a token 102 from the tokenization server 26 in response to the token request 100. In step 306, the controller 54 replaces the item of data with the token 102 (e.g., overwrites the item of data within a memory location 70 with the token 102).

Accordingly, the controller 54 automatically transforms the defined input value into a token. As a result, the electronic device no longer possesses the defined input value, i.e., sensitive information, and is thus compliant with sensitive information regulations. Once the transformation of the defined input value to the token is complete, the electronic device is able to perform other useful operations such as collect purchase habit information and associate that purchase habit information with the token.

In some arrangements, each token 102 is capable of identifying a set of privileges available to certain types of electronic devices 50. For example, the credit card machines or cash registers of a merchant may fall within a first category, and each token 102 may indicate that such merchant devices are "trusted" and thus authorized to communicate with the tokenization server 26. On the other hand, the credit card machines or cash registers of a third party (i.e., not the merchant) may fall within a second category, and each token 102 may indicate that non-merchant devices are "un-trusted" and thus unauthorized to communicate with the tokenization server 26. Further details will now be provided with reference to FIG. 5.

Figure 5:
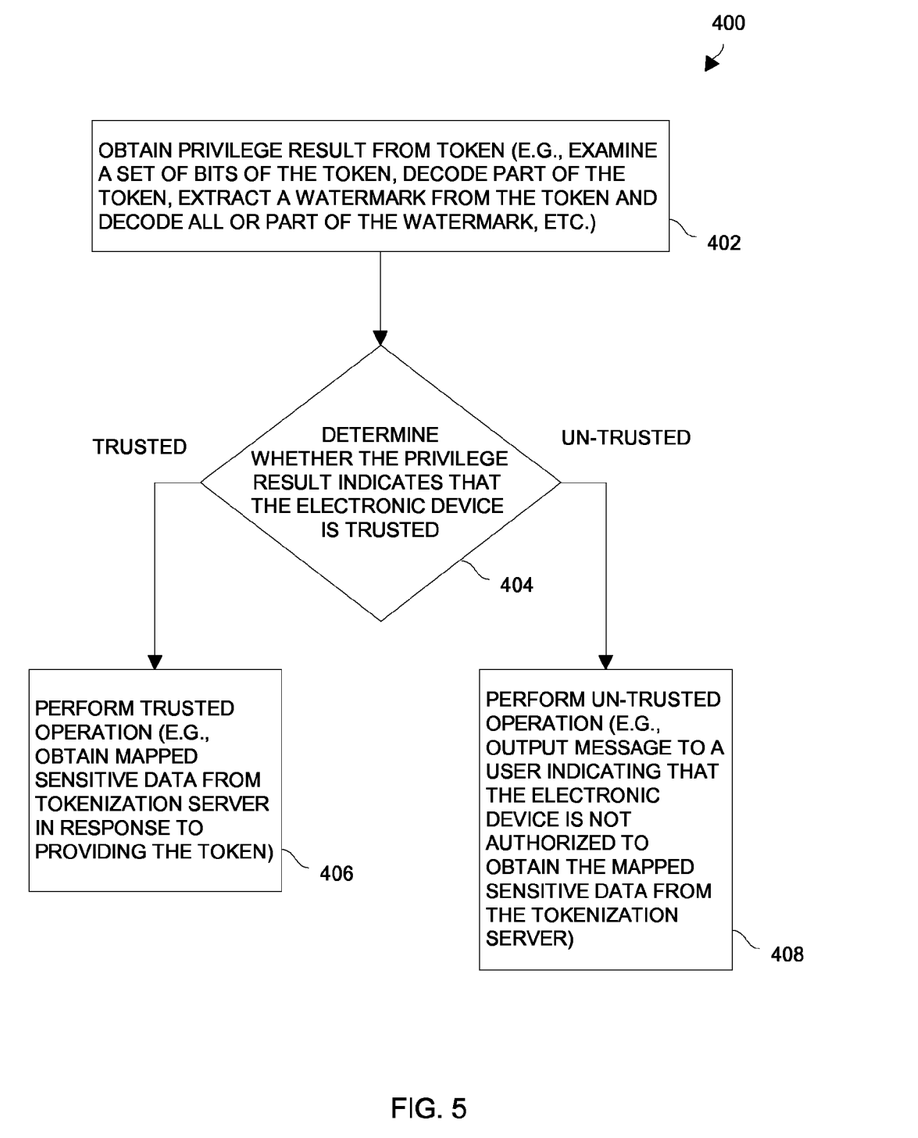
FIG. 5 is a flowchart of another procedure performed by an electronic device of the electronic environment of FIG. 1.

FIG. 5 shows a procedure 400 which is performed by an electronic device 50 when the controller 54 of the electronic device 50 is able to distinguish whether it is "trusted" or "un-trusted". It is assumed that the controller 54 has already determined that the evaluated item of data is not the defined input value but is a valid token 102. That is, the item of data not only satisfies the first set of criteria but also satisfies the requirements for a valid token.

In step 402, the controller 54 obtains a privilege result (i.e., additional information) from the token 102. For example, the controller 54 can examine a particular set of bits from the token 102. As another example, the controller 54 can decode a portion of the token 102, or decode a portion of a watermark which is extracted from the token 102. Such operation may involve application of an algorithm to all or part of the token 102.

In step 404, the controller 54 determines whether the privilege result indicates that the electronic device is trusted. For example, the privilege result may indicate that devices of a certain type or category are trusted, but that devices of another type or category are not trusted. In the context of a credit card environment, a credit card transaction processing company may deem all equipment that it owns as trusted, but all third party equipment to be un-trusted. If the privilege result indicates that the electronic device is trusted, step 404 proceeds to step 406. However, if the privilege result indicates that the electronic device is un-trusted, step 404 proceeds to step 408.

In step 406, the controller 54 performs a trusted operation. For example, the controller 54 could ask the tokenization server 26 to return a mapped sensitive item of data (i.e., the defined input value) such as an actual credit card number in response to a request which includes the token 102.

In step 408, the controller 54 performs an un-trusted operation. For example, the controller 54 outputs a message to a user indicating that the electronic device is not authorized to obtain the mapped sensitive item of data. Again, such operation alleviates the need for the tokenization server 26 to communicate with the electronic device 50 to make such a determination thus reducing the workload on the tokenization server 26. Some techniques for imposing access control policies in devices other than a tokenization server, which are suitable for use in the electronic environment 20, are described in U.S. application Ser. No. 12/826,481, filed on even date herewith, entitled "TECHNIQUES OF IMPOSING ACCESS CONTROL POLICIES", the teachings of which are hereby incorporated in their entirety.

As described above, an improved technique involves automatic detection of a defined input value and transformation of that defined input values into a token 102. For example, upon receipt of potentially sensitive information, an electronic device 50 can determine whether that potentially sensitive information is a credit card number (i.e., a defined input value) or perhaps a token 102. Such a determination is possible even if the token 102 satisfies certain credit card number criteria. If the electronic device 50 determines that the potentially sensitive information is a credit card number, the electronic device 50 can automatically communicate with a tokenization server 26 in order to replace the credit card number with a token 102. However, if the electronic device 50 determines that the potentially sensitive information is a token 102, the electronic device 50 does not need to communicate with the tokenization server 26 thus reducing the workload on the tokenization server 26. That is, some of the work in resolving whether the potentially sensitive information is a credit card number or a token 102 is shifted from the tokenization server 26 to the electronic device 50. Such operation alleviates the need for the electronic device 50 (e.g., payment processing equipment) to communicate with the tokenization server 26 for each item of potentially sensitive information which could be either a token 102 or a credit card number.

While various embodiments of the invention have been particularly shown and described, it will be understood by those skilled in the art that various changes in form and details may be made therein without departing from the spirit and scope of the invention as defined by the appended claims.

For example, at times the various components were described above in the context of a credit card transaction processing environment by way of example only. The various techniques are suitable for handling other types of information as well such as Social Security numbers (i.e., automatic detection and replacement of Social Security numbers with tokens), bank account number, drivers license numbers, health insurance numbers, and so on.

Moreover, it should be understood that a token is a codeword that satisfies some probability distribution P that is defined for a type of raw data input. Along these lines, merely generating a random string of bits is insufficient to obtain a codeword lying in P. In the above-described electronic environment 20, an additional set of conditions R can be imposed thus enabling electronic devices 50 to identify whether items of data are lying in P/R (i.e., members of the set P but not the set R) or R. Such operation is probabilistic: it is certainly possible that raw data may lie in R, but careful system design can diminish this possibility. Items of data lying in R are said to be watermarked. Moreover, determination of membership in R may be a function applied only to the data, or the data combined with an additional piece of data called the key.

What is claimed is:

1. In an electronic device, a method of processing a potentially sensitive item of data, the method comprising:
receiving, by a controller circuit, a data set which includes the potentially sensitive item of data within a physical memory location of the electronic device, and generating, by the controller circuit, a sensitive item of data result and a token result indicating via the token result whether the potentially sensitive item of data of the data set satisfies a valid-token requirement which is characteristic of a token that replaces a potentially sensitive item of data;
storing, by a controller circuit the potentially sensitive item of data of the data set that does satisfy the valid-token requirement in an unaltered form within the physical memory location, and generating, by the controller circuit, a token that does satisfy the valid-token requirement; and replacing, by the controller circuit, the potentially sensitive item of data of the data set that does not satisfy the valid-token requirement within the physical memory location with the generated token that does satisfy the valid-token requirement; and
obtaining, by the controller circuit, at least one of a set of privileges available to at least one of a set of associated electronic devices, and
obtaining, by the controller circuit, data from the set of associated electronic devices based upon the obtained privileges.

2. A method as in claim 1 wherein a data loss prevention (DLP) module is constructed and arranged to (i) analyze items of data and (ii) output DLP results indicating whether the analyzed items of data satisfy a standard set of criteria corresponding to personally identifiable information (PII); and wherein the method further comprises:
prior to generating the token result which indicates whether a potentially sensitive item of data satisfies the valid-token requirement, receiving a particular DLP result outputted from the DLP module indicating that the potentially sensitive item of data satisfies the standard set of criteria corresponding to PII.

3. A method as in claim 2 wherein the particular DLP result outputted from the DLP module indicates that the potentially sensitive item of data satisfies, as the standard set of criteria corresponding to PII, a set of pre-established credit card number requirements; and wherein generating the token result which indicates whether the potentially sensitive item of data satisfies the valid-token requirement includes:
in response to the particular DLP result indicating that the potentially sensitive item of data satisfies the set of pre-established credit card number requirements, analyzing the potentially sensitive item of data to determine whether the potentially sensitive item of data is actually a valid token rather than a credit card number.

4. A method as in claim 3 wherein analyzing the potentially sensitive item of data to determine whether the potentially sensitive item of data is actually a valid token rather than a credit card number includes:
performing a watermark detection operation on the potentially sensitive item of data, the token result indicating that the potentially sensitive item of data is a credit card number when a token watermark is not detected within the potentially sensitive item of data by the watermark detection operation, and the token result indicating that the potentially sensitive item of data is a token when a token watermark is detected within the potentially sensitive item of data by the watermark detection operation.

5. A method as in claim 4, further comprising:
when the token result indicates that the potentially sensitive item of data is a token, extracting privilege information from the token, the privilege information identifying whether the electronic device has trusted access to a credit card number which is (i) stored at a tokenization server and (ii) mapped to the token at the tokenization server.

6. A method as in claim 3 wherein replacing the potentially sensitive item of data within the physical memory location with the token when the token result indicates that the potentially sensitive item of data does not satisfy the valid-token requirement includes:
  sending a tokenization request to a tokenization server which maps tokens to credit card numbers,
  receiving a token from the tokenization server in response to the tokenization request, and
  overwriting the potentially sensitive item of data within the physical memory location with the token.

7. A method as in claim 6 wherein the potentially sensitive item of data within the physical memory location is a credit card number; and wherein the method further comprises:
  prior to overwriting the potentially sensitive item of data within the physical memory location with the token, securely conveying the credit card number to the tokenization server to enable the tokenization server to (i) store the credit card number and (ii) map the token to the credit card number to provide future trusted access to the credit card number.

8. A method as in claim 7, further comprising:
  after overwriting the potentially sensitive item of data within the physical memory location with the token, receiving token input as part of a subsequent transaction,
  based on an analysis of privilege information within the token input, providing a privilege result indicating whether the electronic device has trusted access to the credit card number from the tokenization server,
  rejecting the subsequent transaction when the privilege result indicates that the electronic device does not have trusted access to the credit card number from the tokenization server, and
  communicating with the tokenization server to complete the subsequent transaction when the privilege result indicates that the electronic device has trusted access to the credit card number from the tokenization server.

9. A method as in claim 8 wherein the token input is manually entered by a user;
  wherein the subsequent transaction is a purchase attempt by the user; and wherein the method further comprises:
  after rejecting the subsequent transaction when the privilege result indicates that the electronic device does not have trusted access to the credit card number from the tokenization server, providing a message to the user indicating existence of a lack of trusted access to the credit card number from the tokenization server.

10. A method as in claim 8 wherein the token input is manually entered by a user;
  wherein the subsequent transaction is a purchase attempt from the user; and wherein communicating with the tokenization server to complete the subsequent transaction when the privilege result indicates that the electronic device has trusted access to the credit card number from the tokenization server includes:
  sending a trusted-lookup request to the tokenization server, and
  receiving the credit card number from the tokenization server in response to the trusted-lookup request.

11. An electronic device, comprising:
  a network interface;
  memory; and
  a controller coupled to the network interface and the memory,
  the memory comprising instructions stored therein that when executed by the controller causes the controller to perform the steps of:
  receiving a set of potentially sensitive items of data within a physical memory location of the memory through the network interface, and generating a token result for the item in the set of potentially sensitive items indicating via the token result whether the potentially sensitive item of data does satisfy a valid-token requirement which is characteristic of a token that replaces a potentially sensitive item of data, storing potentially sensitive items of data that do satisfy the valid-token requirement in an unaltered form within the physical memory location, generating a token that does satisfy the valid-token requirement, and replacing the potentially sensitive item of data of the data set that does not satisfy the valid-token requirement within the physical memory location with the generated token; and
  obtaining at least one of a set of privileges available to at least one of a set of associated electronic devices, and
  obtaining data from the set of associated electronic devices based upon the obtained privileges.

12. An electronic device as in claim 11, further comprising:
  a data loss prevention (DLP) module which is constructed and arranged to (i) analyze items of data and (ii) output DLP results indicating whether the analyzed items of data satisfy a set of criteria corresponding to personally identifiable information (PII); and
  wherein the controller is further constructed and arranged to, prior to generating the token result which indicates whether a potentially sensitive item of data satisfies the valid-token requirement, receive a particular DLP result outputted from the DLP module indicating that the potentially sensitive item of data satisfies the set of criteria corresponding to PII.

13. An electronic device as in claim 12 wherein the particular DLP result outputted from the DLP module indicates that the potentially sensitive item of data satisfies, as the set of criteria corresponding to PII, a set of pre-established credit card number requirements; and wherein the controller, when generating the token result which indicates whether the potentially sensitive item of data satisfies the valid-token requirement, is constructed and arranged to:
  in response to the particular DLP result indicating that the potentially sensitive item of data satisfies the set of pre-established credit card number requirements, analyze the potentially sensitive item of data to determine whether the potentially sensitive item of data is actually a valid token rather than a credit card number.

14. An electronic device as in claim 13 wherein analyzing the potentially sensitive item of data to determine whether the potentially sensitive item of data is actually a valid token rather than a credit card number includes:
  performing a watermark detection operation on the potentially sensitive item of data, the token result indicating that the potentially sensitive item of data is a credit card number when a token watermark is not detected within the potentially sensitive item of data by the watermark detection operation, and the token result indicating that the potentially sensitive item of data is a token when a token watermark is detected within the potentially sensitive item of data by the watermark detection operation.

15. An electronic device as in claim 14 wherein the controller is further constructed and arranged to:
  when the token result indicating that the potentially sensitive item of data is a token, extract privilege information from the token, the privilege information identifying whether the electronic device has trusted access to a credit card number which is (i) stored at a tokenization server and (ii) mapped to the token at the tokenization server.

16. A computer program product having a non-transitory computer readable storage medium which stores code to process a set of potentially sensitive items of data, the code including instructions which, when executed by a computer, cause the computer to perform the steps of:
  generating a token result indicating via the token result whether the potentially sensitive items of data satisfy a valid-token requirement which is characteristic of a token that replaces a potentially sensitive item of data;
  storing the potentially sensitive item of data that does satisfy the valid-token requirement in an unaltered form within a physical memory location, generating a token that does satisfy the valid-token requirement; and
  replacing the potentially sensitive item of data that does not satisfy the valid-token requirement within the physical memory location with the generated token;
  obtaining at least one of a set of privileges available to at least one of a set of associated electronic devices, and
  obtaining data from the set of associated electronic devices based upon the obtained privileges.

17. A computer program product as in claim 16 wherein a data loss prevention (DLP) module is constructed and arranged to (i) analyze items of data and (ii) output DLP results indicating whether the analyzed items of data satisfy a set of criteria corresponding to personally identifiable information (PII); and wherein the code further includes:
  instructions to receive a particular DLP result outputted from the DLP module indicating that a potentially sensitive item of data satisfies the set of criteria corresponding to PII, prior to generating the token result which indicates whether the potentially sensitive item of data satisfies the valid-token requirement.

18. A computer program product as in claim 17 wherein the particular DLP result outputted from the DLP module indicates that the potentially sensitive item of data satisfies, as the set of criteria corresponding to PII, a set of pre-established credit card number requirements; and wherein the instructions to generate the token result which indicates whether the potentially sensitive item of data satisfies the valid-token requirement include:
  instructions to analyze the potentially sensitive item of data to determine whether the potentially sensitive item of data is actually a valid token rather than a credit card number in response to the particular DLP result indicating that the potentially sensitive item of data satisfies the set of pre-established credit card number requirements.

19. A computer program product as in claim 18 wherein the instructions to analyze the potentially sensitive item of data to determine whether the potentially sensitive item of data is actually a valid token rather than a credit card number include:
  instructions to perform a watermark detection operation on the potentially sensitive item of data, the token result indicating that the potentially sensitive item of data is a credit card number when a token watermark is not detected within the potentially sensitive item of data by the watermark detection operation, and the token result indicating that the potentially sensitive item of data is a token when a token watermark is detected within the potentially sensitive item of data by the watermark detection operation.

20. A computer program product as in claim 19 wherein the code further includes:
  when token result indicating that the potentially sensitive item of data is a token, instructions to extract privilege information from the token, the privilege information identifying whether the electronic device has trusted access to a credit card number which is (i) stored at a tokenization server and (ii) mapped to the token at the tokenization server.

21. A method as in claim 1 wherein the potentially sensitive item of data complies with a predetermined criteria to appear as a legitimate item of meaningful data; and
  wherein replacing the potentially sensitive item of data with the token includes substituting the potentially sensitive item of data with a new item of data which also complies with the predetermined criteria to appear as a legitimate item of meaningful data.

22. An electronic device as in claim 11 wherein the potentially sensitive item of data complies with a predetermined criteria to appear as a legitimate item of meaningful data; and
  wherein the controller, when replacing the potentially sensitive item of data with the token, is constructed and arranged to:
    substitute the potentially sensitive item of data with a new item of data which also complies with the predetermined criteria to appear as a legitimate item of meaningful data.

23. A computer program product as in claim 16 wherein the potentially sensitive item of data complies with a predetermined criteria to appear as a legitimate item of meaningful data; and
  wherein the instructions to replace the potentially sensitive item of data with the token includes instructions to substitute the potentially sensitive item of data with a new item of data which also complies with the predetermined criteria to appear as a legitimate item of meaningful data.

* * * * *